United States Patent

Uchida et al.

(10) Patent No.: US 6,754,141 B1
(45) Date of Patent: Jun. 22, 2004

(54) RECORDING MEDIUM, METHOD FOR RECORDING AND REPRODUCING DATA USING THE MEDIUM, AND MAGNETO-OPTICAL RECORDING APPARATUS

(75) Inventors: Akiyoshi Uchida, Kawasaki (JP); Masakazu Taguchi, Kawasaki (JP); Akihiro Itakura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 779 days.

(21) Appl. No.: 09/591,445

(22) Filed: Jun. 9, 2000

(30) Foreign Application Priority Data

Jun. 11, 1999 (JP) .......................................... 11-164682

(51) Int. Cl.⁷ .............................................. G11B 11/00
(52) U.S. Cl. ............................... 369/13.54; 369/13.24; 369/13.22; 369/275.4
(58) Field of Search .......................... 369/13.08, 13.35, 369/13.54, 13.24, 275.4, 275.1, 275.3, 275.2, 44.26, 13.32, 13.33, 124.14, 124.04, 47.51, 116

(56) References Cited

U.S. PATENT DOCUMENTS 5,165,089 A * 11/1992 Jaquette et al. ............. 369/59.2
5,394,380 A *  2/1995 Hasegawa ................. 369/13.22
5,450,381 A *  9/1995 Tsukamura et al. ....... 369/13.54
6,058,077 A *  5/2000 Miyaoka ................... 369/13.24

FOREIGN PATENT DOCUMENTS

| JP | 1143041 | 6/1989 |
|----|---------|--------|
| JP | 3093058 | 4/1991 |
| JP | 6076399 | 3/1994 |

* cited by examiner

Primary Examiner—Ali Neyzari
(74) Attorney, Agent, or Firm—Greer, Burns & Crain, Ltd.

(57) ABSTRACT

A magneto-optical recording medium, a method for recording and reproducing data using the medium and a magneto-optical recording apparatus are provided in which an optical head reads the recorded data while applying a magnetic field, and the ill effect of the leakage magnetic field from the neighboring tracks can be suppressed so as to obtain a correctly read signal. The magneto-optical recording medium includes a recording layer, an intermediate layer and a reproduction layer. The signal recorded in the recording layer is read using a light beam irradiated externally and a magnetic field applied externally. The signal recorded in the recording layer is transferred to the reproduction layer via the intermediate layer. Marks are recorded so that each of leading and trailing edges of a recorded mark is substantially aligned with center portions of a recorded mark or a space of neighboring tracks, and the neighboring tracks have different polarities. When reproducing the marks, the signal including the recorded mark is read under the condition where the influences of the leakage magnetic fields from the neighboring tracks counterbalance each other.

8 Claims, 12 Drawing Sheets

RECORDING MEDIUM, METHOD FOR RECORDING AND REPRODUCING DATA USING THE MEDIUM, AND MAGNETO-OPTICAL RECORDING APPARATUS

BACKGROUND OF THE INVENTION

1. Field of the Invention

The present invention relates to a recording medium as well as a method for reading data from and writing data on the medium. A magnetic or magneto-optical recording medium has a large storing capacity, a high degree of reliability and a good portability as a removable recording medium. Therefore, the application field of the magneto-optical recording medium is rapidly widened for a data recording medium of a computer or a recording medium of image information. As the wide application, the request of the market for higher density and larger capacity has been increasing every year.

2. Description of the Prior Art

There are two methods for increasing a recording density (i.e., increasing a recording capacity) of a disk recording medium in which data are written linearly along tracks. The first method increases a bit density on a track, while the second method increases a track density.

The first method has a limitation caused by a diameter of the light beam spot for a magneto-optical recording medium. In order to read a bit written in a period smaller than a beam spot diameter, a smaller diameter of the light beam spot is required. However, the beam spot diameter cannot be smaller than the value determined by a wavelength λ of a light source and a numerical aperture NA of an object lens.

Recently, a technique of reading a bit recorded in a period smaller than the beam spot diameter is proposed in Japanese unexamined patent publication No. 1-143041 or No. 3-93058. This technique utilizes a temperature distribution within the beam spot on the medium and making the recording medium in a multilayer structure for obtaining the effect as if the beam spot is focused more precisely.

Figure 1:
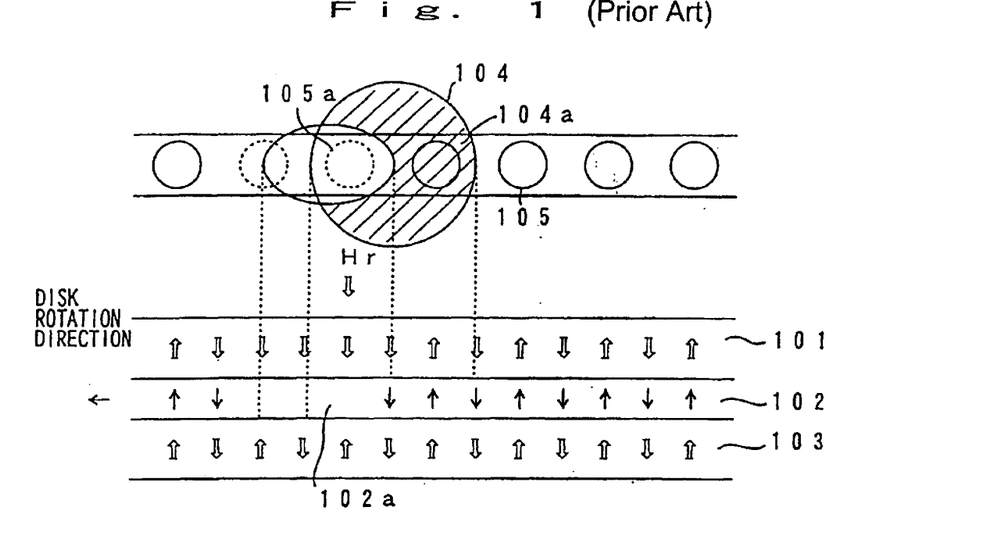
FIG. 1 shows schematically a structure of the conventional recording medium and a method for recording and reproducing data using the medium.

FIG. 1 shows schematically the structure of the conventional recording medium and a method for recording and reproducing data using the medium disclosed in the Japanese unexamined patent publication No. 1-143041. This recording medium has three layers, i.e., a reproduction layer 101, an intermediate layer 102 and a recording layer 103. The bit 105 recorded in the recording layer 103 by a light modulation method is transferred from a low temperature area 104a in a beam spot 104 to the reproduction layer 101 by using an exchange connection via the intermediate layer 102 so as to reproduce the bit 105. In a high temperature area 102a of the intermediate layer 102 whose temperature exceeds the Curie temperature, the exchange connection is interrupted and the magnetization of the reproduction layer 101 is directed to the magnetic field Hr for reading applied externally. Namely, a bit 105a of the recording layer 103 is hidden (is masked magnetically). Thus, among bits located in the beam spot 104, only a bit located in the low temperature area 104a can be read. Accordingly, the reproducing resolution can be improved as if the beam spot is focused more precisely.

Figure 2:
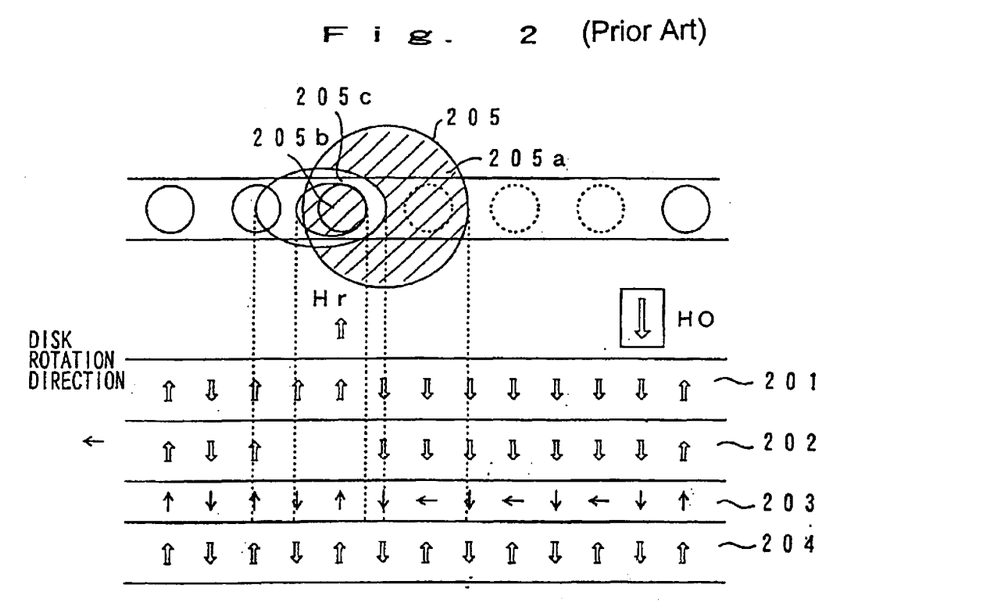
FIG. 2 shows schematically another structure of the conventional recording medium and a method for recording and reproducing data using the medium.

FIG. 2 shows schematically the structure of the recording medium and a method for reading data from and writing data on the medium disclosed in the Japanese unexamined patent publication No. 3-93058. This recording medium has four layers, i.e., a reproduction layer 201, a control layer 202, an intermediate layer 203 and a recording layer 204. In this recording medium, the magnetization of the reproduction layer 201 forms the state where bits are hidden in the low temperature area 205a and the high temperature area 205b within the beam spot 205. Only in a medium temperature area 205c, the bit is transferred from the recording layer 204 to the reproduction layer 201 to be read by the exchange connection. The magnetized state of the reproduction layer 201 in the high temperature area 205b is directed to the magnetic field (reproduction magnetic field) Hr applied externally by the same principle as the recording medium explained above.

In the low temperature area 205a, the magnetized state of the reproduction layer 201 keeps the magnetization direction formed by an initialization magnetic field HO (usually, a magnetic field of a few kilo Oe). This is caused by the fact that the composed coercive force of the reproduction layer 201 and the control layer (also referred to as an auxiliary reproduction layer) 202 in the low temperature area 205a is larger than the exchange connection force from the recording layer 204 via intermediate layer 203. The medium temperature area 205c, i.e., a transfer area is formed when the above-mentioned inequality is inverted as the temperature rises.

Figure 3A:
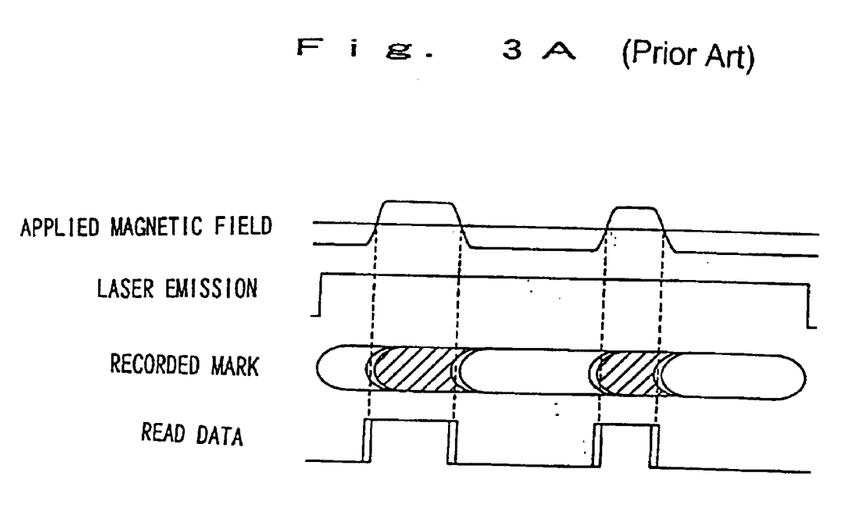
FIGS. 3A and 3B show the relationship among the applied magnetic field, the laser light emission, the recorded mark and the reproduced data when using the conventional recording medium shown in FIG. 1 or FIG. 2.
Figure 3B:
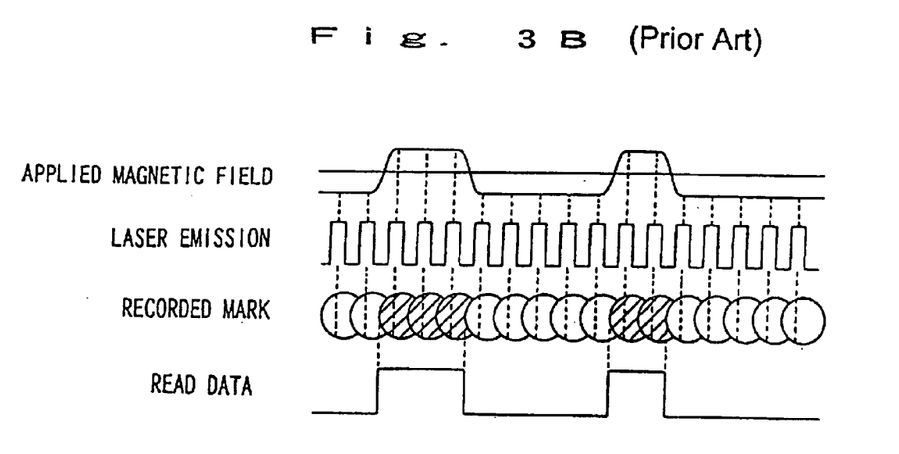

The above-mentioned method for reading data from the magneto-optical recording medium having three or four layer structure is called a magnetic super resolution (MSR) method. FIGS. 3A and 3B show the relationship among the applied magnetic field, the laser light emission, the recorded mark and the reproduced data when using the conventional recording medium shown in FIG. 1 or FIG. 2. FIG. 3A shows the case of magnetic field modulation method in which the laser emits constant light, while FIG. 3B shows the case of magnetic field modulation method in which the laser emits pulsed light. FIGS. 3A and 3B are diagrams explaining the magnetic field modulation recording method. There is another method of light modulation recording method. FIGS. 3A and 3B show an example (the magnetic field modulation) of the recording methods, and another method (light modulation) can be used.

Figure 4:
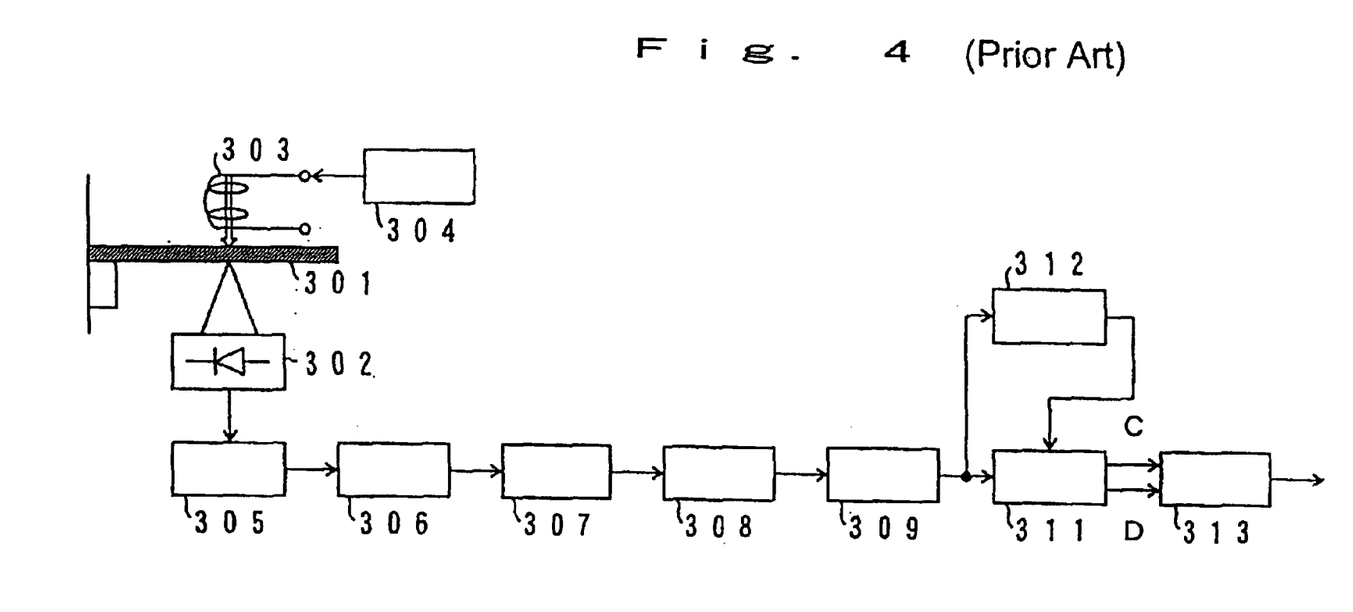
FIG. 4 is a block diagram showing the structure of the conventional recording and reproducing apparatus using the magneto-optical recording medium.

FIG. 4 is a block diagram showing the structure of the conventional recording and reproducing apparatus using the magneto-optical recording medium. A magnetic coil drive circuit 304 drives a magnetic coil 303 so as to generate the magnetic field for reading. The read signal obtained by the optical head 302 is amplified by an amplifier 305, is adjusted about its gain by an automatic gain control (AGC) amplifier 306, is equalized about its waveform by an equalizer 307, and the high frequency noise of the signal is removed by a low pass filter (LPF) 308. The signal is further digitized into a binary signal by a binary circuit 309 and becomes separate data after passing through a data discriminator 311 and a phase-locked loop (PLL) circuit 312. The separate data are given to a demodulator 313, which demodulates the data.

Figure 5:
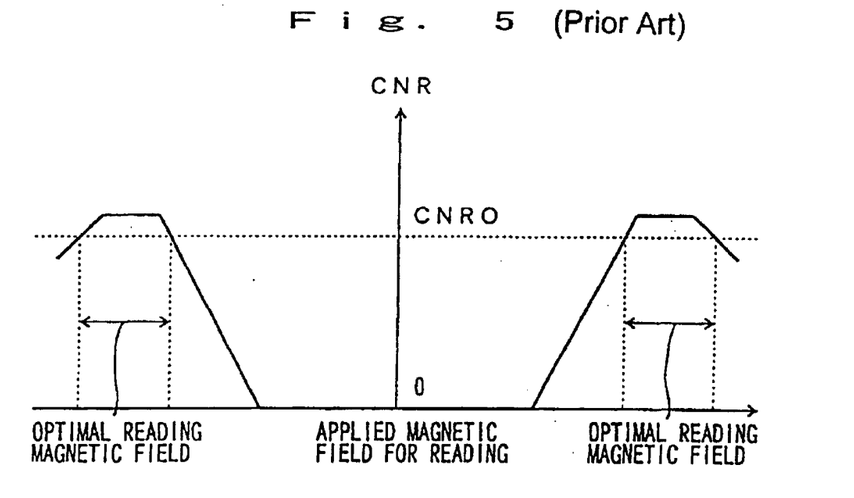
FIG. 5 shows a dependency of the repeatedly recorded mark on the magnetic field for reading.

FIG. 5 shows a dependency of the repeatedly recorded mark on the magnetic field for reading. Namely, FIG. 5 shows a relationship between the applied magnetic field for reading that is necessary when reading data from the recording medium and a ratio of carrier and noise (CNR). It is understood from FIG. 5 that the CNR becomes larger than a predetermined level (CNRO) when the applied magnetic field for reading is within a predetermined range (the optimal reading magnetic field). If the applied magnetic field for reading is too stronger or too weaker than the optimal reading magnetic field, the signal will be deteriorated.

Figure 6:
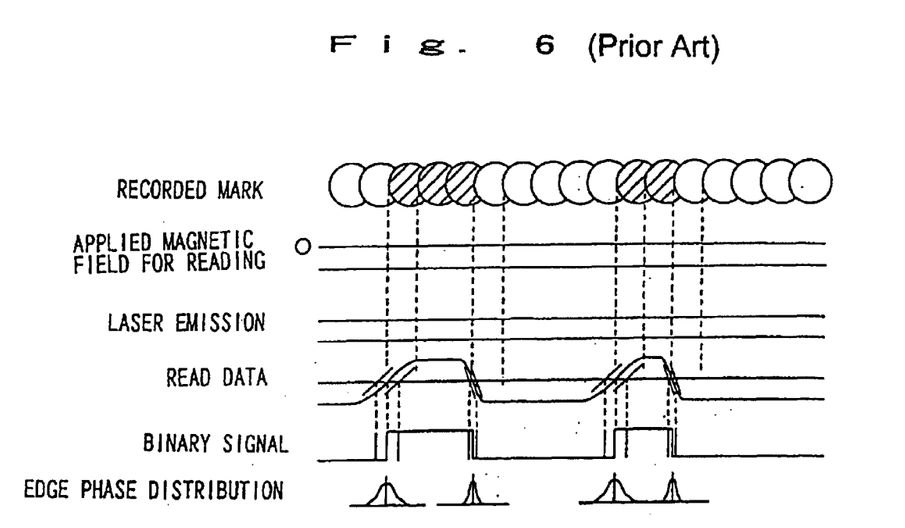
FIG. 6 shows data reproduction waveform and the binary data signal when the applied magnetic field for reading is a negative magnetic field.

FIG. 6 shows data reproduction waveform and the binary data signal when the applied magnetic field for reading is a negative magnetic field. The reproduced waveform obtained by applying the negative magnetic field has a milder gradient in the leading edge than in the trailing edge, so a jitter of the binary signal for the same noise power becomes larger in the leading edge than in the trailing edge. Therefore, the quality of the reproduced data depends on the jitter in the leading edge.

Figure 7:
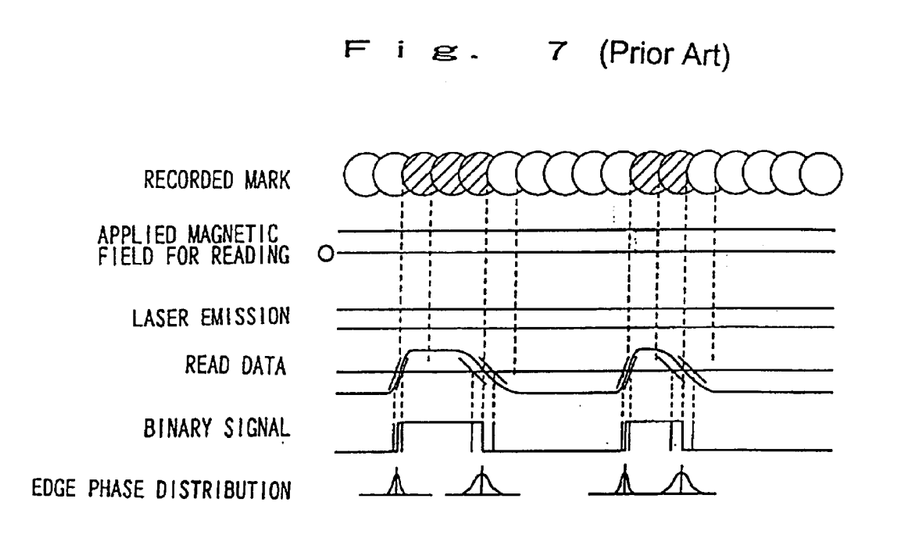
FIG. 7 shows data reproduction waveform and the binary data signal when the applied magnetic field for reading is a positive magnetic field.

FIG. 7 shows data reproduction waveform and the binary data signal when the applied magnetic field for reading is a positive magnetic field. In this case, on the contrary to the case of the negative magnetic field, the reproduced waveform has a milder gradient in the trailing edge than in the leading edge, so a jitter in the trailing edge determines the quality of the reproduced data.

Figure 8:
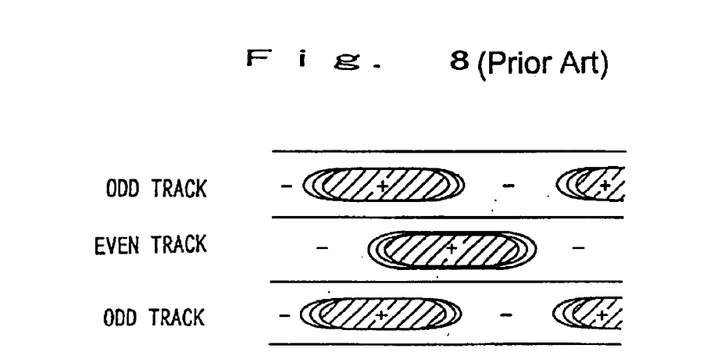
FIG. 8 shows the conventional recording medium in which the recorded marks are arranged in a staggered configuration between the neighboring tracks.

As explained above, when the magnetic super resolution method used for reading a small bit recorded on a three layer or four layer structure of recording medium, the read signal becomes asymmetric so that the gradient of the leading edge or the trailing edge becomes mild, resulting in a deterioration of a quality of reproduced data. In addition, the second method for improving the recording density includes the method of narrowing the track width so as to improve the track density and the method of recording data on both lands and grooves. When improving the track density by these methods, a cross talk problem will be caused by a mark of the neighboring track that enters the beam spot for reading the present mark. In order to solve this problem, a method disclosed in Japanese unexamined patent publication No. 1-143041 or No. 3-93058 can be used. This method can read only the mark of the current track to be read by virtually decreasing the effective beam spot diameter. Furthermore, as shown in FIG. 8, there is a method for suppressing the influence of the cross talk by arranging the recorded marks in a staggered configuration between the neighboring tracks (see Japanese unexamined patent publication No. 6-76399, for example).

In order to achieve higher density of a disk recording medium, it is necessary to use a technique to improve a bit density and a technique to improve a track density simultaneously. In this case, since the mark is recorded by magnetization recording, there is a problem that the leakage magnetic field from the neighboring recorded mark affects the current track. This is another problem different from the above-mentioned cross talk in the narrow meaning.

The ill effect of this leakage magnetic field cannot be improved even if the effective beam spot diameter is decreased virtually as described in Japanese unexamined patent publication No. 1-143041 or No. 3-93058. Namely, the ill effect of the magnetic field cannot be suppressed. In addition, the width of the recorded mark in the magnetic field modulation recording method that enables the higher density recording is generally wider than that in the light modulation recording method, so it is affected by the leakage magnetic field of the neighboring track more easily.

Particularly, when using the magnetic field for reading, the effective magnetic field that the recorded bit of the current track receives from the leakage magnetic field of the neighboring track changes and becomes out of the range of the optimal reading magnetic field shown in FIG. 5. As a result, the recorded data of the current track cannot be read correctly due to the ill effect of the leakage magnetic field of the neighboring track.

In addition, if an even track is to be read, the recording method shown in FIG. 8 increases the influences of the leakage magnetic fields of the neighboring tracks (odd tracks), since they have the same polarity. Namely, noting the leading edge (the left side) of the recorded bit of the even track in the center as shown in FIG. 8, the both neighboring odd tracks are magnetized in the positive polarity. Noting the trailing edge, the both neighboring odd tracks are magnetized in the negative polarity. In this way, as the ill effect of the leakage magnetic field from the tracks neighboring the current track increases, the effective magnetic field that the recorded bit of the current track receives go out of the range of the optimal reading magnetic field, so that the correct reproduction cannot be performed.

Furthermore, as explained above, the waveform of the read signal becomes asymmetric under a constant magnetic field applied for reading, and the gradient of the leading edge or the trailing edge becomes mild. As a result, the jitter at the edge with the mild gradient is deteriorated, so that the quality of the reproduced data is deteriorated.

SUMMARY OF THE INVENTION

The object of the present invention is to provide a magneto-optical recording medium, a method for writing data on and reading data from the medium and a magneto-optical recording apparatus, in which the recorded signal is read by an optical head while applying a magnetic field, and an ill effect of the leakage magnetic field from the neighboring track can be suppressed so as to obtain a correctly read signal.

A magneto-optical recording medium according to the present invention uses a light beam irradiated externally and a magnetic field applied externally for reading the recorded data. Each of leading and trailing edges of a recorded mark is substantially aligned with center portions of a recorded mark or a space of neighboring tracks, and the neighboring tracks have different polarities.

A first method for writing data on and reading data from a magneto-optical recording medium according to the present invention uses a light beam irradiated externally and a magnetic field applied externally. The method comprises the steps of writing marks so that each of leading and trailing edges of a recorded mark is substantially aligned with center portions of a recorded mark or a space of neighboring tracks, and that the neighboring tracks have different polarities; and reading a signal including the recorded mark in the condition where influences of leakage magnetic fields of the neighboring tracks counterbalance each other by positioning a light beam spot for reading at substantially the center in the width direction of the track to be read.

According to the above-mentioned magneto-optical recording medium and the method, the influences of the leakage magnetic fields from the tracks neighboring the current track to be read are canceled, so that the recorded signal of the current track is correctly read with being hardly affected by the leakage magnetic field from the neighboring tracks.

A second method for writing data on and reading data from a magneto-optical recording medium according to the present invention comprises the steps of writing marks so that each of leading and trailing edges of a recorded mark is substantially aligned with center portions of a recorded mark or a space of neighboring tracks, and that the neighboring tracks have different polarities; and reading a signal including the recorded mark in the condition where the external magnetic field plus a leakage magnetic field of one of the neighboring tracks is the optimal reading magnetic field by shifting a light beam spot for reading in the width direction of the track from the center to one of the neighboring tracks and by setting the intensity of the external magnetic field weaker than the optimal reading magnetic field.

According to the second method, the leakage magnetic field from the neighboring track is utilized for reducing the necessary magnetic field to be applied for reading, so that the magnetic coil can be downsized and the power for driving the coil can be reduced. In addition, as the magnetic field is reduced, the magnetic field can be switched more rapidly for a high speed transmission or a high density recording. Since the leakage magnetic fields of the tracks neighboring the current track to be read have opposite direction to each other in the magneto-optical recording medium of the present invention, one of the leakage magnetic fields undoubtedly has the same direction as the magnetic field for reading, i.e., the direction that strengthens the magnetic field for reading.

Preferably, the first or the second method explained above further includes the step of switching the polarity of the external magnetic field for the leading edge and the trailing edge of the recorded mark. Thus, a sharp waveform of read signal can be obtained in both the leading edge and the trailing edge of the recorded mark, so that a jitter is reduced. Accordingly, any one of the edges or the both edges can be used for reproducing the recorded data.

It is also preferable that the writing step of the first or the second method includes the steps of shifting the position of at least one of the leading and trailing edges of the recorded mark along the track for multilevel recording in which a recorded mark has plural bit information. Especially, the sharp edge of the reproduced waveform facilitates the multilevel recording by shifting the position of the edge.

A magneto-optical recording apparatus according to the present invention comprises a magneto-optical recording medium from which recorded data are read by using a light beam irradiated externally and a magnetic field applied externally; means for applying the magnetic field for reading to the magneto-optical recording medium; an optical head for irradiating a light beam onto the magneto-optical recording medium and for reading a signal recorded in the magneto-optical recording medium in accordance with the light after reflected by the magneto-optical recording medium; and means for determining the optimal value or the optimal range of the magnetic field to be applied externally in accordance with a signal read by the optical head from a reference area of the magneto-optical recording medium. This magneto-optical recording apparatus can read the recorded signal correctly since the optimal value or the optimal range of the magnetic field to be applied externally is automatically determined. In addition, this apparatus can easily realize the second method explained above.

DESCRIPTION OF THE PREFERRED EMBODIMENTS

Hereinafter, the present invention will be explained in detail with reference to embodiments and accompanied drawings.

Figure 9:
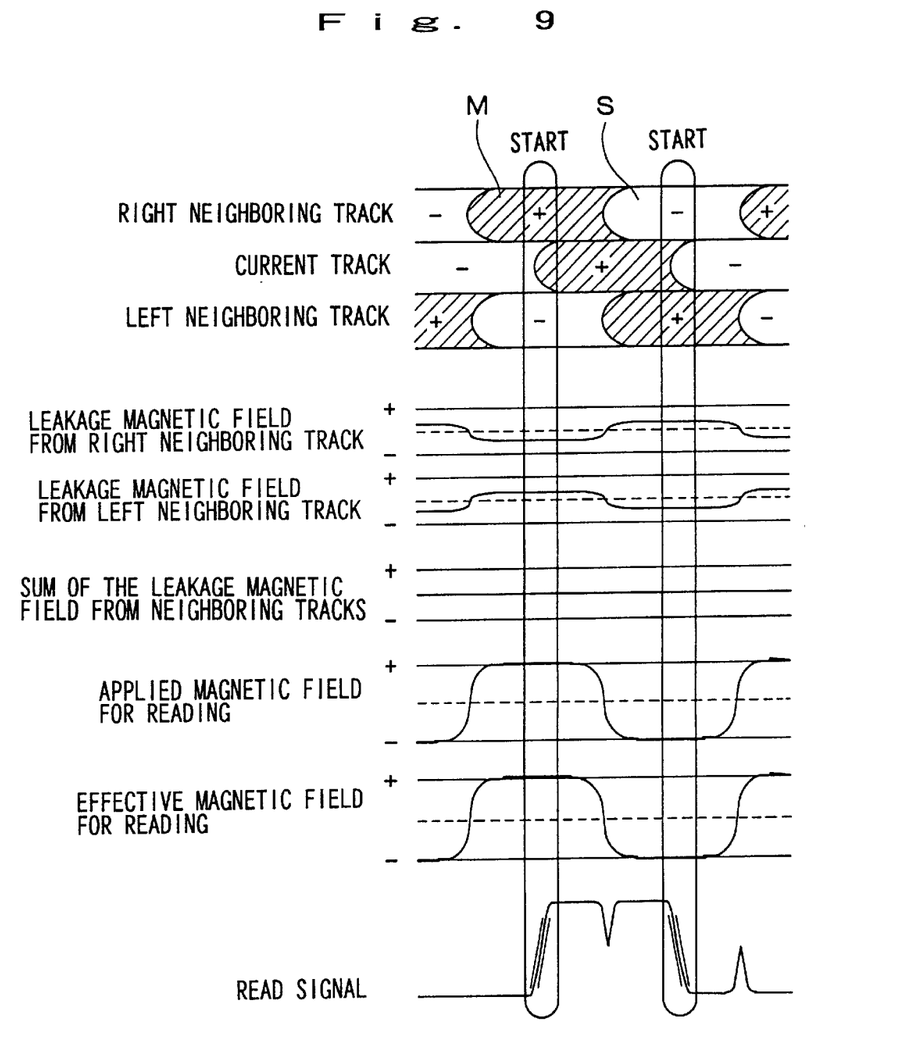
FIG. 9 shows an example of signal waveforms in a first embodiment of the present invention.

FIG. 9 shows an example of signal waveforms in a first embodiment of the present invention. In this embodiment, when recording marks on track of a recording medium, the recorded marks M are written in positions shifted by half of a clock in the order of the right neighboring track, the current track and the left neighboring track. In addition, the polarity of the magnetic field of the recorded mark M is set positive (+), while the polarity of the magnetic field of the space S is set negative (−). Thus, each of the leading edge and the trailing edge of the recorded mark M is aligned with center portions of the recorded mark M or the space S of the neighboring tracks, and the neighboring tracks have different polarities.

In addition, the polarity of the magnetic field applied for reading at the start of writing (at the leading edge of the recorded mark) is set positive (+). The effective magnetic field for reading at the leading edge is the sum of the magnetic field applied externally and the leakage magnetic fields of the neighboring tracks. The leakage magnetic fields of the neighboring tracks can be cancelled since they have the opposite polarities. As a result, the effective magnetic field for reading is substantially equal to the magnetic field applied externally. Thus, according to this embodiment, the recorded signal can be read correctly with being hardly affected by the leakage magnetic field from the neighboring track.

In addition, the applied magnetic field for reading is switched at the center portion of the recorded mark, so that the polarity of the applied magnetic field at the trailing edge of the recorded mark is set negative (−). At the trailing edge too, the leakage magnetic fields from the neighboring tracks are cancelled to be zero in the same way as the leading edge, so the signal can be read with being hardly affected by the leakage magnetic field from the neighboring track. Furthermore, by switching the applied magnetic field for reading at the center portion of the recorded mark, the waveform reproduced by the magnetic super resolution (MSR) method becomes sharp in both leading and trailing edges so that the jitter is reduced. Therefore, any of the edges can be used for reproducing the signal. Though the applied magnetic field for reading is switched in synchronization with the recorded mark of the neighboring track in FIG. 9, the synchronization is not always required. It is enough that the magnetic field is switched at the timing of detecting the leading edge.

Figure 10:
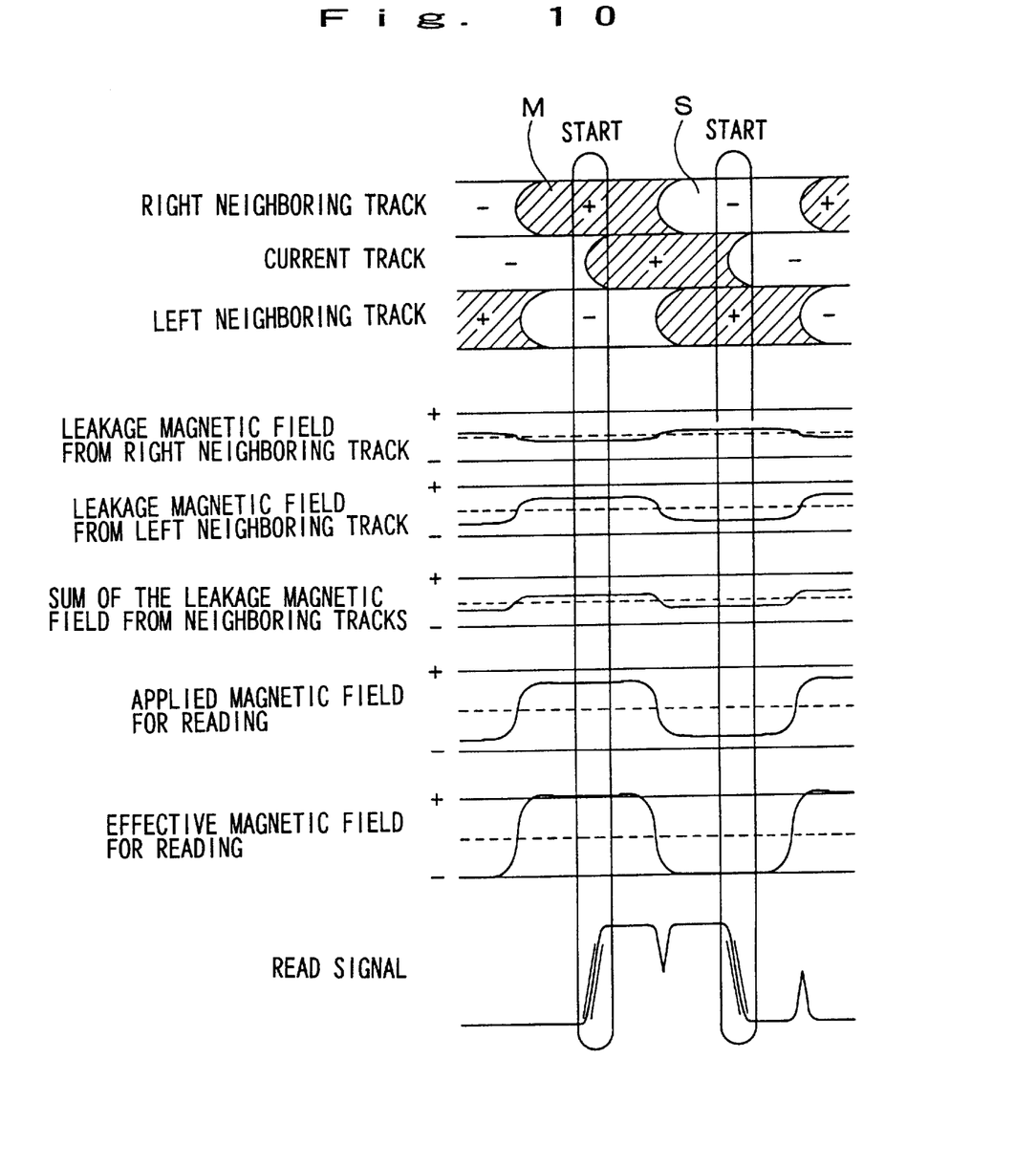
FIG. 10 shows an example of signal waveforms in a second embodiment of the present invention.

FIG. 10 shows an example of signal waveforms in a second embodiment of the present invention. This embodiment is different from the first embodiment shown in FIG. 9 in that the optical head above the current track is shifted (i.e., is detracked) in the direction toward one of the neighboring tracks. FIG. 10 shows an example in which the optical head is detracked to the left neighboring track.

As shown in FIG. 10, being detracked to the left, the influence of the leakage magnetic field from the left track is larger than that from the right track. Therefore, leakage magnetic fields of the neighboring tracks are not cancelled and remain the sum of the leakage magnetic fields having the same polarity as the leakage magnetic field from the left track. As a result, the leakage magnetic field strengthens the applied magnetic field for reading. Therefore, the applied magnetic field for reading can be set smaller by the value of the leakage magnetic field. In this embodiment too, the applied magnetic field for reading is switched at the center portion of the recorded mark in the same way as the first embodiment, so any of the edges can be used for reproducing the signal.

Furthermore, the recorded marks are written in positions shifted by half of a clock in the order of the right neighboring track, the current track and the left neighboring track. Therefore, the position of the leading edge or the trailing edge of the recorded mark of the current track corresponds to the center portion of the mark or the space of the neighboring track. Therefore, even if the optical head is detracked, the above-mentioned problem of cross talk does not occur.

Figure 11:
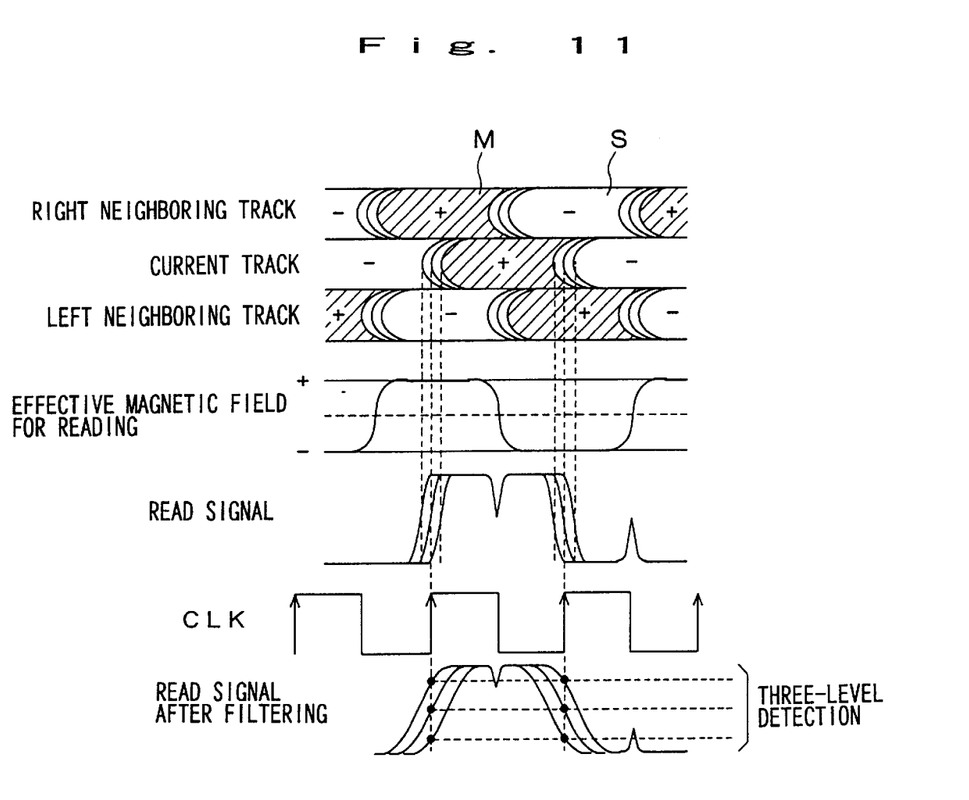
FIG. 11 shows an example of signal waveforms in a third embodiment of the present invention.

FIG. 11 shows an example of signal waveforms in a third embodiment of the present invention. This embodiment realizes the multilevel recording by shifting the position of the leading edge or the trailing edge of the recorded mark in the first or the second embodiment. The clock signal (CLK) is synchronized with the recorded mark, so that a level detection is performed at the leading edge of the clock signal. In the example shown in FIG. 11, each position of the leading edge and the trailing edge is changed in three ways, so that three levels can be recorded and reproduced by each edge. However, the number of the level (the edge positions) is not limited to three, but can be two levels or more than four levels. Alternatively, only one of the leading edge and the trailing edge can be used for the multilevel recording.

Figure 12:
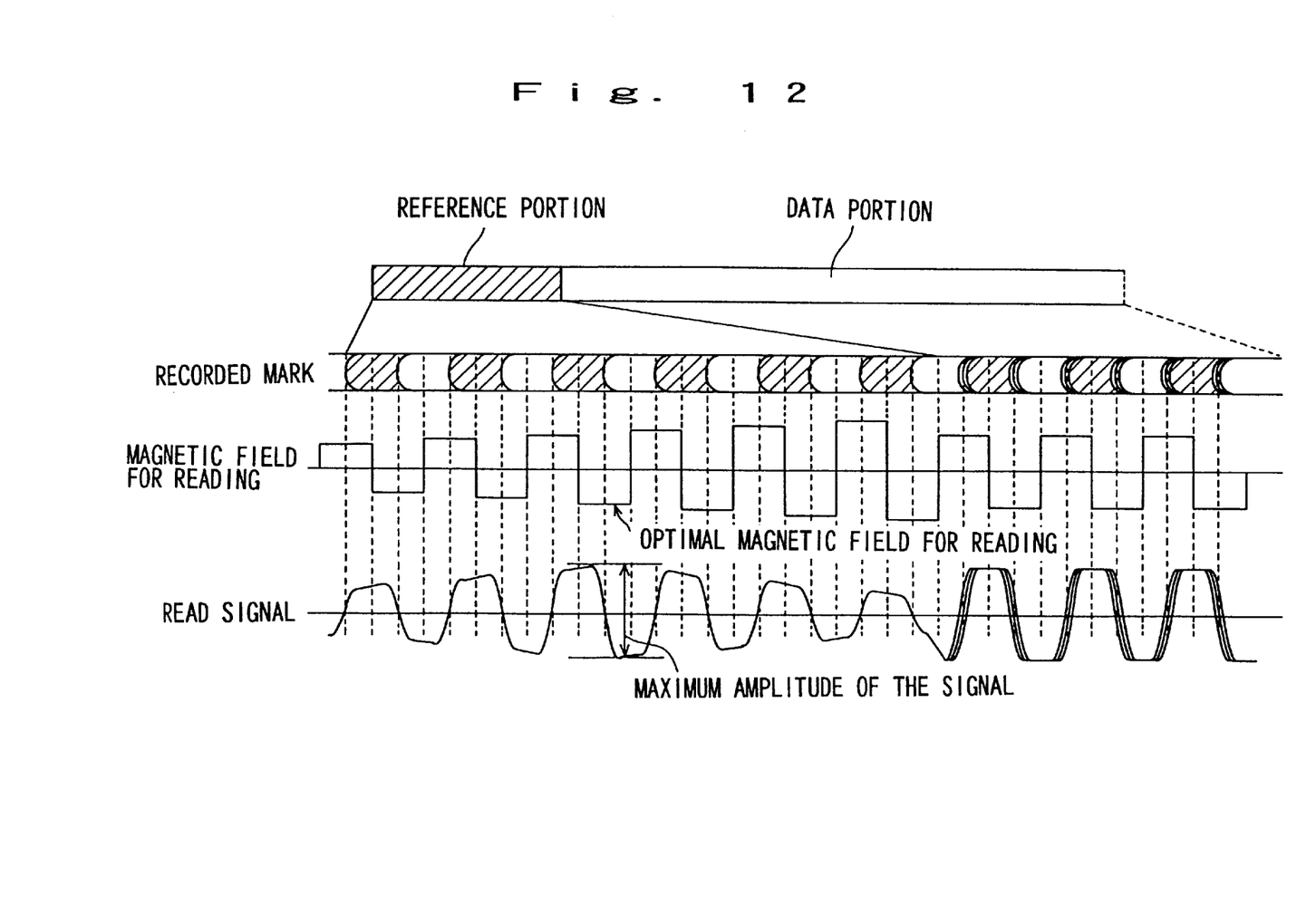
FIG. 12 shows an example of waveforms in the method of determining the optimal value of the applied magnetic field for reading according to the present invention.

FIG. 12 shows an example of waveforms in the method of determining the optimal value of the applied magnetic field for reading (hereinafter, referred to as the optimal reading magnetic field) according to the present invention. As shown in FIG. 12, a reference area for determining the optimal reading magnetic field for reading is provided in the recorded data of the recording medium. In the reference area a predetermined pattern of marks is written. The applied magnetic field for reading is increased from the minimum value within a predetermined range when reading the reference area, or is decreased from the maximum value.

If the applied magnetic field for reading is increased as shown in FIG. 12, the amplitude of the read signal increases along with the increase of the applied magnetic field for reading. However, when the applied magnetic field for reading exceeds a predetermined vale, the amplitude of the read signal decreases. Therefore, the optimal reading magnetic field is determined to be the applied magnetic field for reading when the read signal is the maximum or to be the intermediate value of the applied magnetic fields for reading when the amplitude of the read signal is above the threshold. The concrete method for the latter is shown in FIG. 13.

Figure 13:
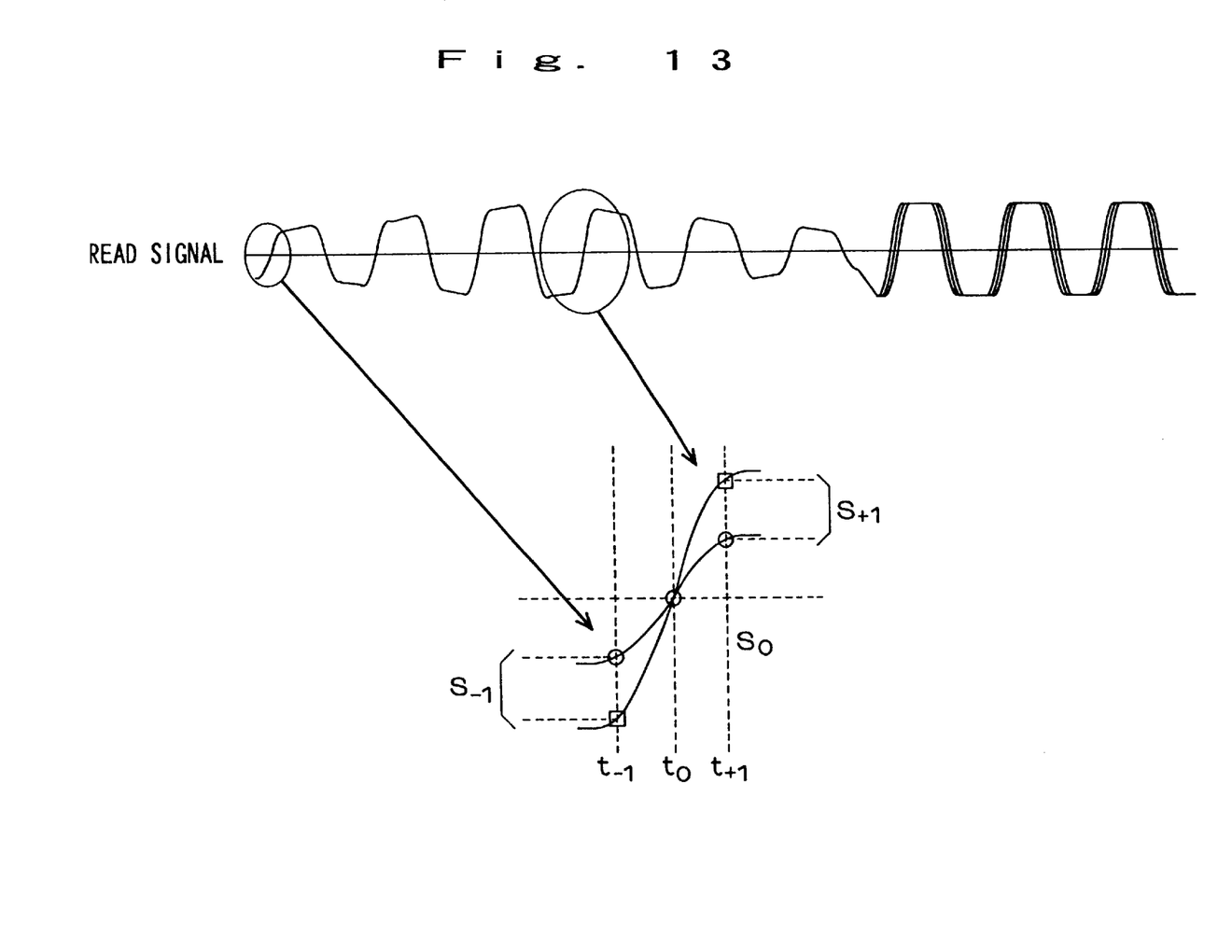
FIG. 13 shows an example of waveforms in the method of determining the optimal reading magnetic field to be the intermediate value of the applied magnetic fields for reading when the amplitude of the read signal is above the threshold.

FIG. 13 shows an example of waveforms in the method of determining the optimal reading magnetic field to be the intermediate value of the applied magnetic fields for reading when the amplitude of the read signal is above the threshold. As shown in FIG. 13, the levels $S_1$, $S_0$ and $S_{+1}$ at three continuous time points (the discrete time points) $t_{-1}$, $t_0$ and $t_{+1}$ are sampled in accordance with the clock signal. Using these sampled values $S_{-1}$, $S_0$ and $S_{+1}$, the intermediate value between the maximum magnetic field and the minimum magnetic field within the range that satisfies the following inequality is determined to be the optimal reading magnetic field.

$$(S_{+1}-S_0)^2+(S_{-1}-S_0)^2 \geq X$$

Here, X is the threshold value. Since the sum of square values is used for determination, fluctuations in the clock can be compensated.

Figure 14:
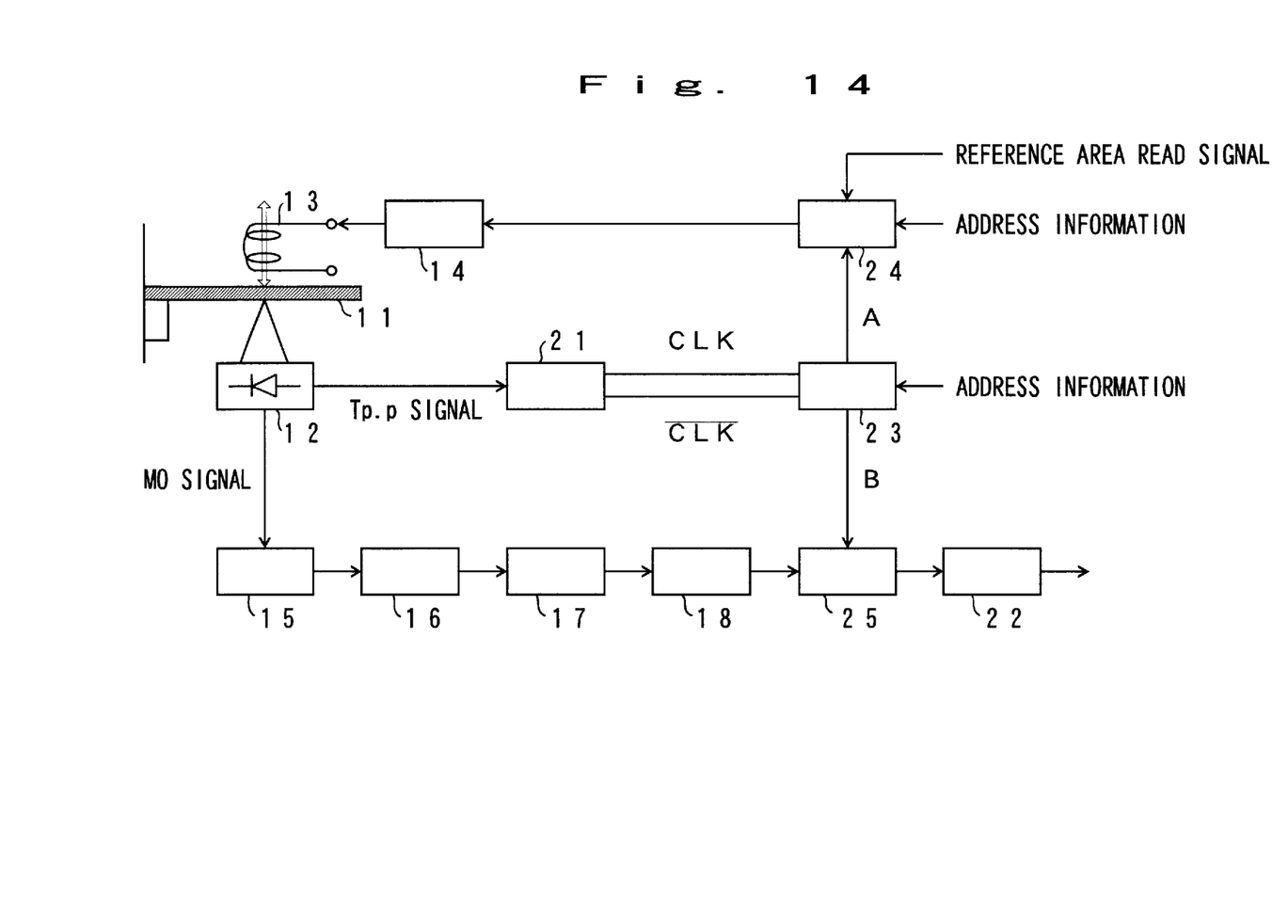
FIG. 14 is a block diagram of an example of a magneto-optical recording apparatus utilizing the recording medium and the method of the present invention.

FIG. 14 is a block diagram of an example of a magneto-optical recording apparatus utilizing the recording medium and the method of the present invention. A magnetic coil drive circuit 14 drives a magnetic coil 13 so as to apply a magnetic field to a recording medium 11. The recorded data of the recording medium 11 are read by an optical head 12 so as to obtain a read signal. The read signal is amplified by an amplifier 15. The gain of the read signal is adjusted by an automatic gain control (AGC) amplifier 16, and the waveform of the signal is equalized by an equalizer 17. In addition, a low pass filter (LPF) 18 removes high frequency noises from the signal, which is given to a level detector 25.

The read signal of prepits of the recording medium 11 is given to a phase-locked loop (PLL) circuit 21, which generates a clock (CLK) signal and an inverted clock (*CLK) signal. The CLK signal and the *CLK signal (the prefix "*" means the inverted logic) is given to a selector 23 as an external clock.

Figure 15:
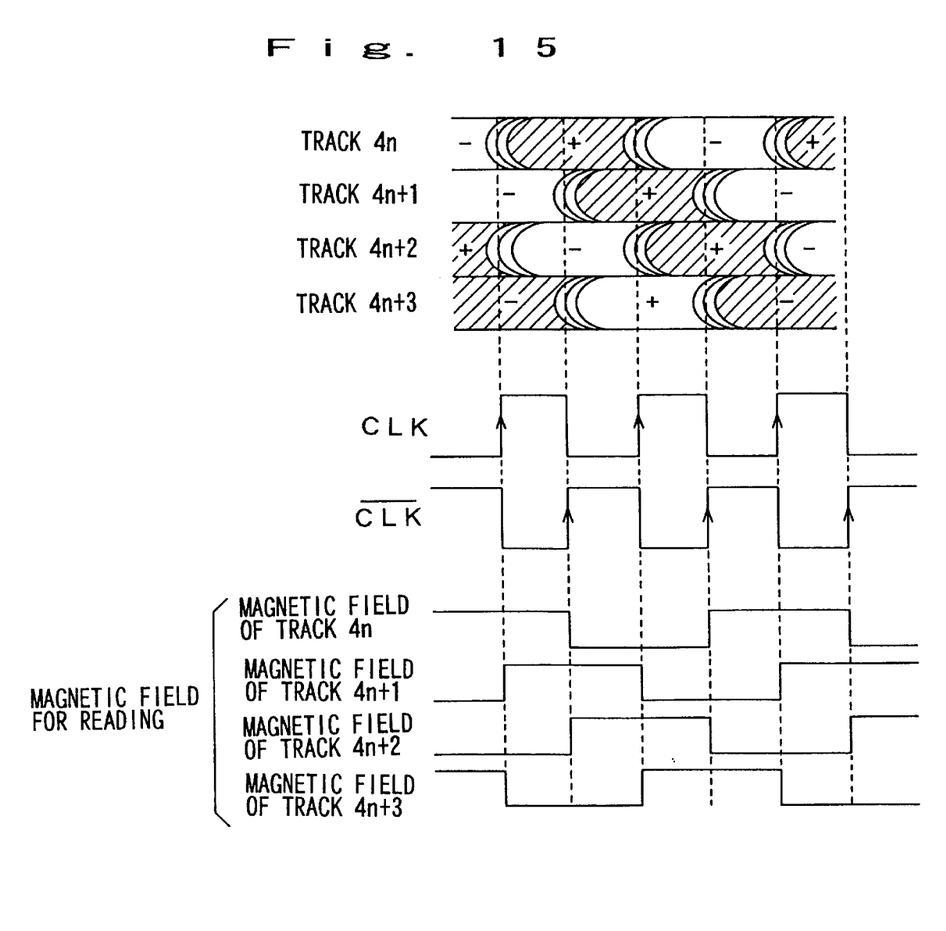
FIG. 15 shows waveforms indicating the relationship among the recorded mark, the magnetic field for reading and the clock signal in the magneto-optical recording apparatus shown in FIG. 14.

FIG. 15 shows waveforms indicating the relationship among the recorded mark, the magnetic field for reading and the clock signal in the magneto-optical recording apparatus shown in FIG. 14. The selector 23 outputs the CLK signal and the *CLK signal to the A line or the B line in accordance with address information given externally. The A line is connected to a reading magnetic field modulating circuit 24, while the B line is connected to a level detector 25. Namely, the selector 23 decided whether the current track is an even track or an odd track in accordance with the address information, and outputs the *CLK signal to the A line and the CLK signal to the B line if it is an even track, while outputs the CLK signal to the A line and the *CLK signal to the B line if it is an odd track.

The address information is also given to the reading magnetic field modulating circuit 24. The reading magnetic field modulating circuit 24 decides which number the current track is, 4n, 4n+1, 4n+2 or 4n+3 (n is zero or a natural number). The leading edge of the CLK signal or the *CLK signal that is inputted from the A line is used for switching the polarity of the magnetic field for reading. Namely, the polarities of the magnetic field in the tracks 4n, 4n+1, 4n+2 and 4n+3 are changed as shown in FIG. 15. Furthermore, as explained above, the optimal reading magnetic field is determined in accordance with the read signal of the reference area. Thus, a control signal is given to the magnetic coil drive circuit 14 from the reading magnetic field modulating circuit 24 so that the relationship between the edge of the recorded mark and the magnetic field for reading shown in FIG. 11 can be obtained.

The level detector 25 detects the level of the read signal at the leading edge of the CLK signal or the *CLK signal that is input from the B line as shown in FIG. 11. The detected level is sent to the demodulator 22 and is demodulated. The example shown in FIG. 11 can obtain nine ($=3^2$) values for one recorded mark since three levels can be detected at leading and trailing edges of the recorded mark. Therefore, three-bit information can be demodulated.

Generally speaking, if the number of the multilevel of the recorded mark is n, $n^2$ values of information can be obtained from one recorded mark, so that the number of the information bits that can be demodulated corresponds to the maximum value satisfying the inequality, $n^2 \geq 2^m$. If n is four, two bit information can be demodulated at each of the leading edge and the trailing edge, so that four-bit information can be demodulated from one recorded mark. Alternatively, only one of the leading edge and the trailing edge of the recorded mark can be used for the multilevel demodulating.

In the embodiments mentioned above, the magneto-optical recording medium is used. The magnetic recording medium may also be used in the present invention.

As explained above, according to the magneto-optical recording medium and the recording and reproducing method of the present invention, the influences of the leakage magnetic field from the tracks neighboring the current track can be cancelled, so that the recorded signal of the current track can be read correctly with being hardly affected by the leakage magnetic field from the neighboring tracks.

In addition, according to another method of the present invention, the leakage magnetic field from the neighboring track is used effectively for strengthening the applied magnetic field for reading, which can be set weaker than the optimal reading magnetic field. Thus, the energy to generate the magnetic field for reading can be saved. In addition, the magneto-optical recording apparatus according to the present invention can automatically determine the optimal value or the optimal range of the magnetic field for reading, so that the recorded signal can be read correctly.

What is claimed is:

1. A magneto-optical recording medium from which recorded data are read by using a light beam irradiated externally and a magnetic field applied externally, wherein each of leading and trailing edges of a recorded mark is substantially aligned with center portions of a recorded mark or a space of neighboring tracks, and the neighboring tracks have different polarities.

2. A method for writing data on and reading data from a magneto-optical recording medium by using a light beam irradiated externally and a magnetic field applied externally, the method comprising the steps of:

writing marks so that each of leading and trailing edges of a recorded mark is substantially aligned with center portions of a recorded mark or a space of neighboring tracks, and that the neighboring tracks have different polarities; and reading a signal including the recorded mark in the condition where influences of leakage magnetic fields of the neighboring tracks counterbalance each other by positioning a light beam spot for reading at substantially the center in the width direction of the track to be read.

3. The method of the claim 2, further comprising the step of switching the polarity of the external magnetic field for the leading edge and the trailing edge of the recorded mark.

4. The method of the claim 2, wherein the writing step includes the step of shifting the position of at least one of the leading and trailing edges of the recorded mark along the track for multilevel recording in which a recorded mark has plural bit information.

5. A method for writing data on and reading data from a magneto-optical recording medium by using a light beam irradiated externally and a magnetic field applied externally, the method comprising the steps of:

writing marks so that each of leading and trailing edges of a recorded mark is substantially aligned with center portions of a recorded mark or a space of neighboring tracks, and that the neighboring tracks have different polarities; and reading a signal including the recorded mark in the condition where the external magnetic field plus a leakage magnetic field of one of the neighboring tracks is the optimal reading magnetic field by shifting a light beam spot for reading in the width direction of the track from the center to one of the neighboring tracks and by setting the intensity of the external magnetic field weaker than the optimal reading magnetic field.

6. The method of the claim 5, further comprising the step of switching the polarity of the external magnetic field for the leading edge and the trailing edge of the recorded mark.

7. The method of the claim 5, wherein the writing step includes the step of shifting the position of at least one of the leading and trailing edges of the recorded mark along the track for multilevel recording in which a recorded mark has plural bit information.

8. A magnetic recording medium from which recorded data are read by using a magnetic field applied externally, wherein each of leading and trailing edges of a recorded mark is substantially aligned with center portions of a recorded mark or a space of neighboring tracks, and the neighboring tracks have different polarities.

* * * * *